United States Patent [19]

Buller et al.

[11] 4,066,992
[45] Jan. 3, 1978

[54] SEISMIC MINE MONITORING SYSTEM

[75] Inventors: Paul L. Buller; William L. Chapman; Bobby J. Thomas; James C. Fowler, all of Ponca City, Okla.

[73] Assignee: The United States of America as represented by the Secretary of the Interior, Washington, D.C.

[21] Appl. No.: 620,976

[22] Filed: Oct. 9, 1975

[51] Int. Cl.² .......................... G01V 1/16; G01V 1/22
[52] U.S. Cl. ................... 340/15.5 MC; 340/15.5 DS; 340/261; 299/1; 299/12; 340/15
[58] Field of Search ............... 340/15.5 MC, 15.5 DS, 340/261, 213 R, 181, 15; 299/12, 1

[56] References Cited

U.S. PATENT DOCUMENTS

| 3,552,520 | 1/1971 | Nauerbeit | 340/15 |
| 3,564,493 | 2/1971 | Hicklin | 340/15 |
| 3,569,923 | 3/1971 | Nauerbeit et al. | 340/261 |
| 3,714,622 | 1/1973 | Wilhelmsen | 340/261 |
| 3,717,864 | 2/1973 | Cook | 340/261 |
| 3,824,532 | 7/1974 | Vandierendonck | 340/261 |
| 3,879,720 | 4/1975 | Dusheck, Jr. | 340/261 |
| 3,922,663 | 11/1975 | Lubke et al. | 340/261 |
| 3,949,353 | 4/1976 | Waters et al. | 299/12 |

Primary Examiner—Howard A. Birmiel
Attorney, Agent, or Firm—Gersten Sadowsky; Donald A. Gardiner

[57] ABSTRACT

A surveillance system for maintaining continuous vigil as to seismic energy generating disturbances in and around an underground mine, such system being one of permanent installation which in combination with central data processing apparatus provides a continuous data output indication of certain mine activities. The system utilizes a plurality of permanently installed, underground geophone sensors each in communication via particular ACC circuitry and signal processing circuitry to provide input through an interface logic network to a central computer equipment programmed to determine disturbance locations, certain intensities, time duration and the like.

5 Claims, 8 Drawing Figures

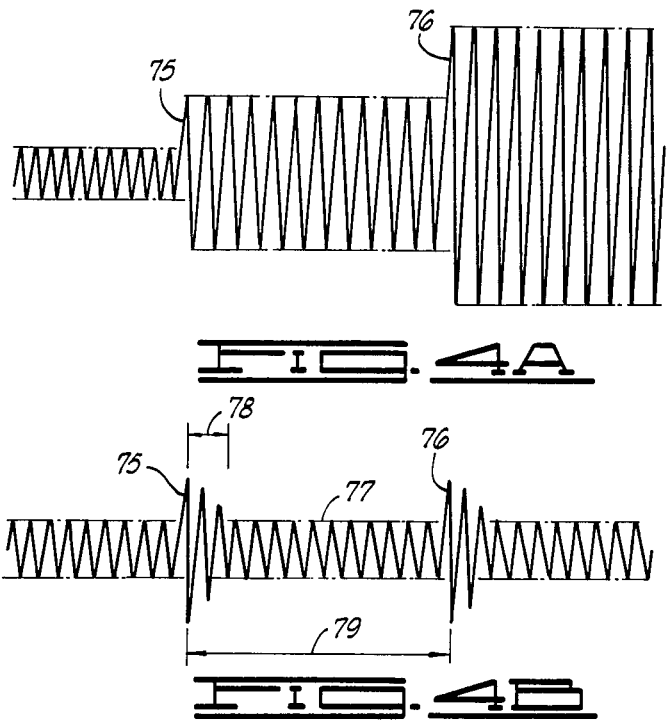
FIG. 4A
FIG. 4B
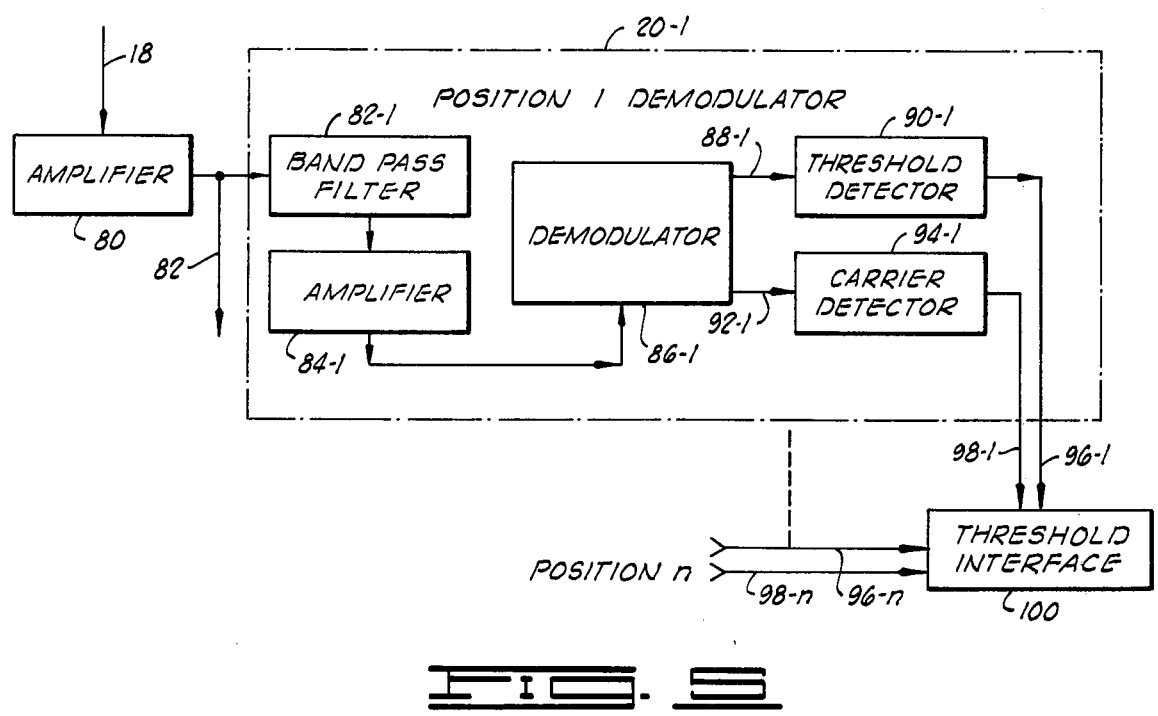
FIG. 5

SEISMIC MINE MONITORING SYSTEM

This invention resulted from work done under Contract No. H0133112 with the Bureau of Mines in the Department of the Interior and is subject to the terms and provisions of the President's Patent Policy Statement of Oct. 10, 1963.

BACKGROUND OF THE INVENTION

1. Field of the Invention

The invention relates generally to mine surveillance systems and, more particularly, but not by way of limitation, it relates to a permanent form of installation for detecting and processing seismic data indicative of disturbances in and around an underground mine.

2. Description of the Prior Art

Various attempts to derive meaningful subterranean information relative to mine activity or emergency location needs are present in the prior art. There have been devised many forms of electrically actuated indicator apparatus for conveying a particular condition from an underground mine location to a surface station thereby to provide alarm or warning when necessitated. Such systems, however, have been limited to an actively operable transmission type of link, whether by electric wire, radio wave propagation or voice tube. Still other teachings have long dwelled on the possibility of some form of sound locating apparatus wherein acoustic energy is surface-detected to derive either message information or underground location information, but in general such devices have been rudimentary in nature and deployed in non-uniform, unique manner for each given instance. The closest prior art known to Applicants is U.S. Pat. No. 3,132,330 in the name of Donner entitled "Electric Alarm Systems". This system utilizes a plurality of ground-disposed geophones for detecting subsurface disturbances which are individually connected to a particular alarm device characteristic of a surface position. Also to be included in the prior art must be the U.S. Patent application Ser. No. 423,279 as filed on Dec. 10, 1973 entitled "Underground Mine Surveillance system" and assigned to the present assignee now abandoned in favor of application Ser. No. 589,569, filed June 23, 1975, and issued as U.S. Pat. No. 3,949,353 on Apr. 6, 1976.

SUMMARY OF THE INVENTION

The present invention contemplates a seismic energy detection surveillance device for underground mines wherein a plurality of geophones are permanently disposed at a plurality of sites over an underground mine location for continual sensing and transmission of seismic disturbance indications to a central processing location. Particular AGC circuitry and transmission circuitry having high signal-to-noise capabilities provides a seismic data input via an interface logic network to a central computer which functions to maintain a continual log of seismic source disturbances enabling the computer to determine general type, location and times of disturbance for output as recorded data.

Therefore, it is an object of the present invention to provide a mine surveillance system which provides accurate record of locations, times and intensities of all seismically related disturbances in or around the mine.

It is also an object of the invention to provide an apparatus which utilizes a relatively low cost mini-computer for effecting surveillance and record output of disturbances in and around an underground mine.

Finally, it is an object of the present invention to provide a seismic surveillance system for underground mines wherein components are relatively permanently installed in non-interfering relationship to mine activity while yet providing continual information as to disturbance time, location and the like.

Other objects and advantages of the invention will be evident from the following detailed description when read in conjunction with the accompanying drawings which illustrate the invention.

Brief Description of the Drawings

FIGS. 4A and 4B illustrate in idealized form the automatic gain control function utilized in the present invention;

FIG. 6 is a flow diagram illustrating the logical sequence and operation of a threshold interface utilized in the present invention.

Detailed Description of the Preferred Embodiment

Figure 1:
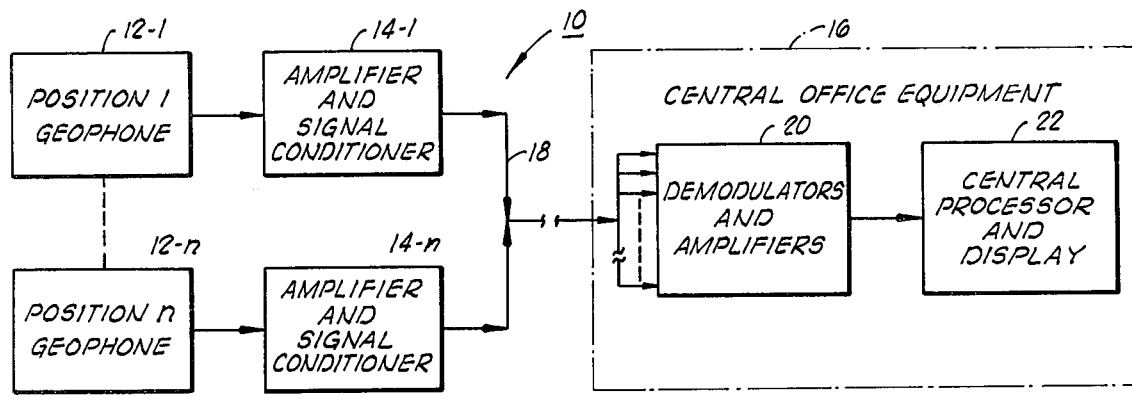
FIG. 1 is a basic block diagram of the seismic energy monitoring system.

FIG. 1 illustrates the basic surveillance system 10 as employed in permanent installation over an underground mine site. A plurality of permanently installed geophones 12-1 through 12-n are permanently disposed at selected locations over the mine. As is not generally well known, underground mines, especially coal mines, extend for considerable distances at various sublayers under the earth such that the spaced geophone positions 12-1 through 12-n are separated by large distances on the order of several miles in some cases. In one present installation of the surveillance system 10, an underground coal mine extends over approximately an area of 14 miles and nine such geophone positions 12-1 through 12-n are utilized, with each known geophone position being no closer than approximately one-half mile to any other.

Each of the remotely disposed geophone positions 12-1 through 12-n is connected to a respective amplifier and signal conditioner 14-1 through 14-n as disposed at the remote position for the purpose of pre-conditioning the sensed geophone signal for transmission to the central office equipment 16 via the existing communication FAN line 18. FAN communication lines are simply a two-wire signal carrier and are existent and readily accessible in and about a mine location. As will be further described, seismic signals generated at the remote positions are pre-conditioned and then transmitted, e.g., via amplitude modulation, for separation at the central office equipment 16 and application to the central processing equipment.

Thus, seismic signals amplitude modulated on selected carriers on FAN line 18 are then applied to demodulators and amplifiers 20 which function to separate the seismic signals for each of the remote positions 12-1 through 12-n, such separation and ordering being through the inherent frequency selectivity of the band pass filter, and the seismic signals are then applied to a central processor and display 22.

Each of the geophones at positions 12-1 through 12-n is mounted in an all-weather type of enclosure, and buried approximately 40 feet below the surface of the earth with lead up of connecting cables to the surface for connection to each associated amplifier and signal conditioner 14-1 through 14-n. Geophones presently utilized are the Mark Products Type L-1, a well-known and commercially available type of unit. The amplifier and signal conditioner will be further described below, as this equipment utilizes a characteristic form or AGC circuitry as coupled with modulation circuitry for placing the modulated seismic signal data onto the FAN line 18. The central office equipment 16 utilizes a central processor and display 22 which presently takes the form of a Texas Instruments 980A Computer with 8192 words of memory. The visual display presently utilized is a Tektronix Model 611 Storage-Type Scope, and a permanent paper record is kept on a Texas Instruments Model 733ASR. In addition to providing a paper record and keyboard input to the system, the 733ASR has a dual cassette record playback capability which is used to modify programs and to provide program input for the system.

The demodulators and amplifiers 20 consist of a series of band pass filters each connected to FAN line 18 and serving to separate the signals from each geophone of positions 12-1 through 12-n. A conventional bank of amplifiers and associated demodulators then serve to detect each geophone signal for output through a threshold detector circuit (to be described) and application to an interface circuit for input to the computer (also to be described).

Figure 2:
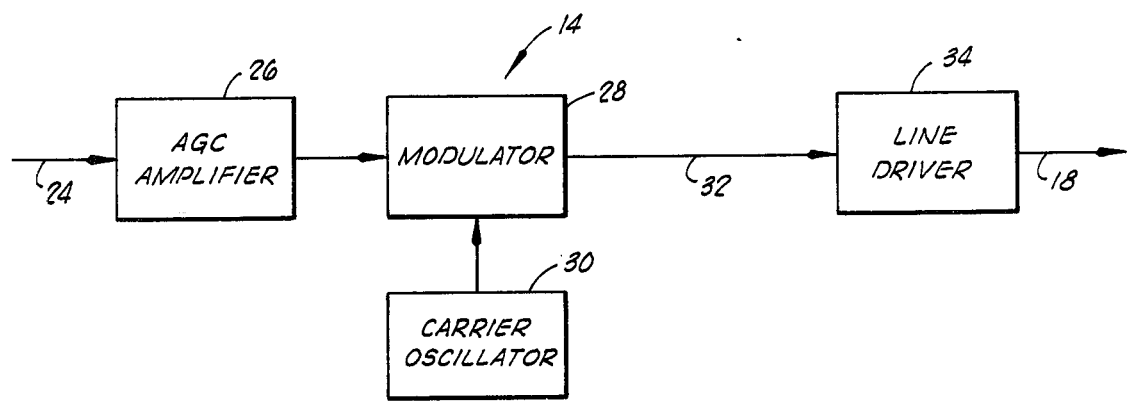
FIG. 2 is a block diagram of the seismic amplifier as used at geophone installations of the present system.

FIG. 2 illustrates amplifier and signal conditioner circuit 14 as is associated with each geophone output of position 12-1 through position 12-n. Input from the respective geophones is supplied via line or connector cable 24 to an AGC amplifier 26 having characteristic design parameters as will be further described. Output from the AGC amplifier 26 is then applied to a modulator 28, in the preferred case an amplitude modulator, which also receives input of a characteristic carrier oscillator frequency from carrier oscillator 30, and modulated output is applied via line 32 to a respective power amplifier or line driver 34 for transmission via FAN line 18. The amplitude modulator 28 and line driver 34 may be conventional forms of circuitry suitable for transmission in the requisite frequency and power range.

Figure 3:
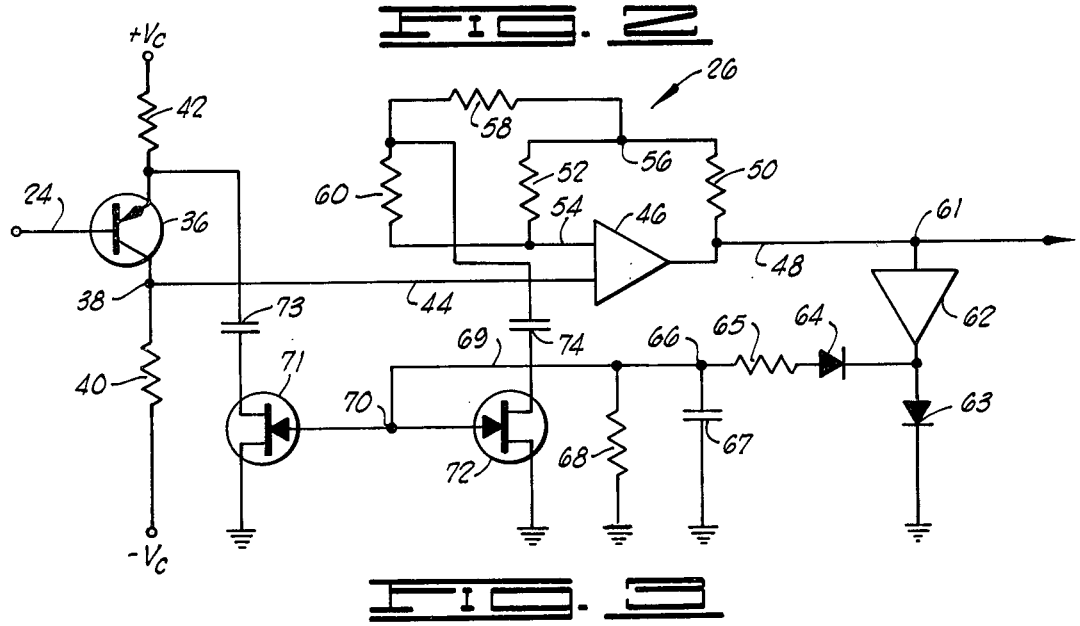
FIG. 3 is a schematic diagram of one form of automatic gain control circuit which is preferred for use in the present system.

FIG. 3 illustrates in schematic form a preferred form of AGC amplifier 26 having the desired output characteristics for function within the system. Thus, seismic signal input is applied via connector cable 24 (FIG. 2) to the base of a PNP transistor 36. The collector of transistor 36 is connected via junction point 38 and resistor 40 to the $-V_c$ voltage supply while the emitter is connected through a resistor 42 to the $+V_c$ supply. The transistor 36 functions as a low noise amplifier having gain of approximately 100:1. The amplified output from transistor 36, as appears at junction point 38, is then applied on an input lead 44 to an integrated circuit amplifier 46 functioning in the operational amplifier mode. The attendant operational amplifier circuitry consists of output lead 48 providing feedback via a resistor 50 in series with resistor 52 to input 54, coupled with a parallel resistor network comprising junction point 56, resistor 58, series resistor 60 and input lead 54.

Amplifier 46 provides output via lead 48 to the modulator 28 (FIG. 2) as well as output from a junction point 61 to an integrated circuit amplifier 62 which functions as a D-C amplifier. Output from amplifier 62 is then applied for voltage doubling by means of a common-connected rectifier 63 and parallel connected rectifier 64 in series with a timing resistor 65 to junction point 66. A capacitor 67 is then connected between junction point 66 and common while a parallel-connected timing resistor 68 and capacitor 67 constitute a timing network, as will be further described, which is connected via lead 69 to a junction point 70 connected to the respective gates of tandem-connected field effect transistors (FET) 71 and 72. The base one connections of each of field effect transistors 71 and 72 are connected to common, while the base two connections are connected through respective capacitors 73 and 74 to the emitters of transistor 36 and input 54 of amplifier 46, respectively.

In operation of the FIG. 3 amplifier 26, input seismic signal at input 24 is amplified through amplifier 36 to provide output on lead 44 for further amplification in operational amplifier 46. The amplified output signal level on lead 48 (junction point 61) is then further amplified by D-C amplifier 62 for voltage doubling and rectification through the rectifier network consisting of rectifiers 63 and 64. The D-C feedback signal is then applied through the timing network consisting of resistors 65 and 68 and capacitor 67 for application to junction point 70 and each of the FET's 71 and 72. FET's 71 and 72 function as variable resistors in well-known manner to effect gain control, i.e., with increased D-C Voltage level at junction point 70, resistance of the respective FET's 71 and 72 decreases thereby to adjust the output gain of respective transistor amplifier 36 and operational amplifier 46. The charging time constant is set by resistor 65 sand capacitor 67 and, in present practice, values are designated to set the time constant on the order of 300 milli-seconds. The discharge time constant of the feedback network is then determined by values of resistor 68 and capacitor 67, and this time is presently selected to be approximately the same time constant as that of the charging RC combination.

The time constants are selected in accordance with the frequency response of the desirable or usable mine surveillance seismic signals. Thus, the amplifier 26 has the unique property of setting the output signal to some predetermined amplitude, while the input may fluctuate by as much as 1000:1. The time constant is adjusted so that fast rising impulses which are larger than the ambient noise coming into the amplifier will not be attenuated for a set period of time, e.g., 300 milliseconds, after which, if the amplitudes are still above the ambient noise, the AGC action will reduce the amplitude to the value of output ambient noise. Once the seismic impulses have disappeared, the AGC amplifier 26 will increase the gain to raise the output back to its predetermined level. This is a slow action and takes from one to two seconds.

FIGS. 4A and 4B illustrate in idealized form the AGC action of amplifier 26. FIG. 4A illustrates what may be a more or less usual form of seismic signal to be sensed in and around an underground mine wherein a number of work sounds are continually being produced and it is desired to differentiate from such ambient noise signals and other emergency-indicative types of seismic signal. FIG. 4B then represents in amplitude versus time the effect of passing the signal of FIG. 4A through AGC amplifier 26, i.e., the output of the AGC amplifier would be afffected as shown in FIG. 4B. Thus, the initial fast rising peaks 75 and 76 would be passed through amplifier 26 and appear as peak indications 75a and 76a, but later responses would be reduced back to a pre-set signal level 77 during approximately a 300 millisecond interval as indicated by arrow 78. A hold time of one to two seconds is indicated by arrow 79 as being that period during which the amplifier recovers after a first peak indication and is enabled to allow amplification of the second peak indication 76a. The characteristic time delays utilized in the AGC amplifier are selected in accordance with the character, propensities and reoccurrence probabilities of seismic signals to be encountered in and around the underground mine.

The AGC action of amplifier 26 works to keep the ambient noise level constant while allowing impulsive seismic events to be passed in their true form. The amplified geophone signal output from AGC amplifier 26 is then modulated in modulator 28, each geophone signal or position having its own unique carrier frequency as provided by the carrier oscillator 30, whereupon the modulator output is amplified in line driver 34 onto the FAN communication line 18.

Figure 5:
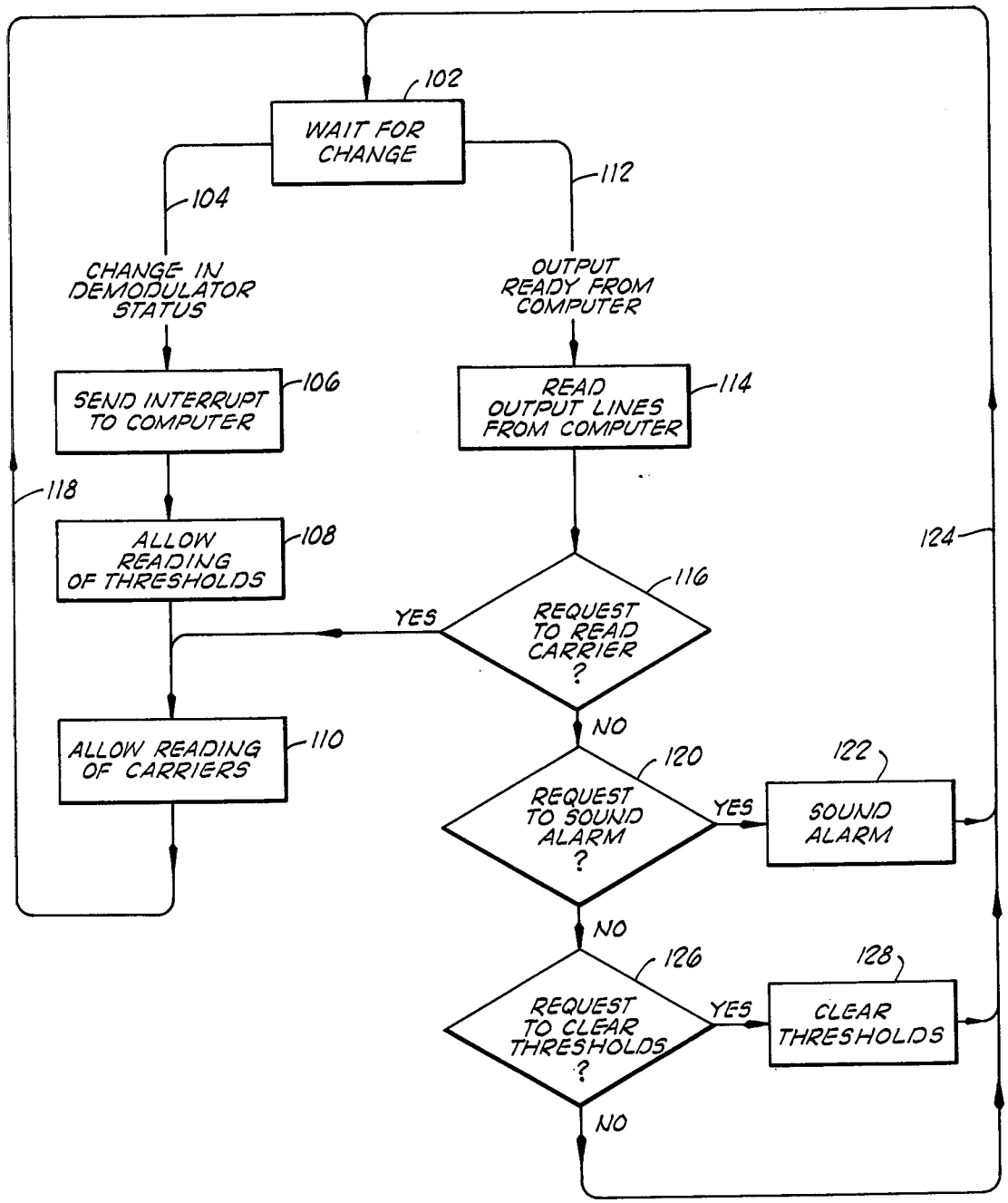
FIG. 5 is a block diagram of the demodulator and amplifier circuitry of the present invention.

FIG. 5 illustrates demodulator and amplifier circuitry 20-1 as utilized in the present invention. All modulated carrier signals from geophone positions 12-1 and 12-n are input from FAN communication line 18, a two-wire pair conductor, and the signal is then amplified in a conventional form of broad band amplifier 80 for output on a lead 82. Lead 82 is then applied to each of the separate position demodulators 20-1 through 20-n, i.e., one for each geophone position or station. A band pass filter 82-1 then filters the modulated position 1 seismic signal for amplification through an amplifier 84-1 to a demodulator 86-1 which also may be a conventional form of circuitry for providing demodulation of the amplitude modulated signal. Thus, the recovered seismic signal is output on lead 88-1, amplified and passed through a threshold detector 90-1. The carrier amplitude is also detected for presence as provided on output 92-1 for application to a carrier detector circuit 94-1. The outputs from threshold detector 90-1 and carrier presence detector 94-1 are then applied via respective inputs 96-1 and 98-1 to a respective threshold interface logic circuit of threshold interface 100. Similar data for the remaining geophone detector positions 1 through n are also applied to respective logic circuits of the threshold interface 100, as indicated by inputs 96-n and 98-n.

The circuitry of FIG. 5, including the threshold interface, as located at the central mine office, provides the following basic functions:
amplification of composite signals;
separation of signals from each station;
detection of large amplitude events on the geophone signal; and
detection of presence of each carrier frequency.

The outputs from this circuitry to the computer consist of logical voltage levels discriminatory as to whether or not there is a qualifying seismic event on a given channel with presence of carrier.

The threshold interface 100 functions through parallel elemental logic circuits to allow changes in the threshold and carrier status of each geophone position to be properly entered into the computer in central processor and display 22. Interface 100 can also operate to turn on an alarm to notify mine personnel of abnormal conditions. The individual threshold logic devices of logic interface 100, i.e., individual logic circuits for each channel or geophone position data handling, are set high by an event on the corresponding geophone position channel, whereupon the high state is held until the computer issues a command to clear the threshold logic devices.

The geophone position threshold logic devices of threshold interface 100 may be constructed in any of various well-known circuit arrangements, the primary requirement being only that the logical operation proceed as shown by the flow diagram of FIG. 6. Thus, an initial flow stage 102 provides dual output upon sense of a change in the input status signal, i.e., from the threshold detector 90 and carrier detector 94 of the particular geophone position circuitry 1-n. Upon sense of a change in signal input, output via line 104 signifies change in demodulator status which thereupon sends an interrupt command to the associated computer, in this case the Texas Instruments Model 980A. Interrupt signalling by flow stage 106 then allows reading of thresholds from all threshold interface devices as shown by flow stage 108, and subsequently in accordance with flow stage 110, all carrier data is read into the computer. Also upon changes sensed at input stage 102, flow line 112 signifies output ready from the computer whereupon flow stage 114 functions to read all output lines from the computer. Upon reading output lines, a decision stage 116 queries as to whether or not to read carrier, if "YES" flow proceeds through flow stage 110 to carry out the function with return signified to the input stage 102 via line 118. If decision stage 116 indicates "NO", signification is passed to a serial decision stage 120 for sound of alarm. Affirmative output at decision stage 120 effects sounding of the alarm as shown in stage 112 with return signified via flow line 124 back to the input flow stage 102. A negative indication from decision stage 120 then passes onto a next serial flow stage 126 to request clearing of thresholds, affirmative output effecting clearance of thresholds at flow stage 128 while negative indication recycles with signification to the input flow stage 102.

Figure 7:
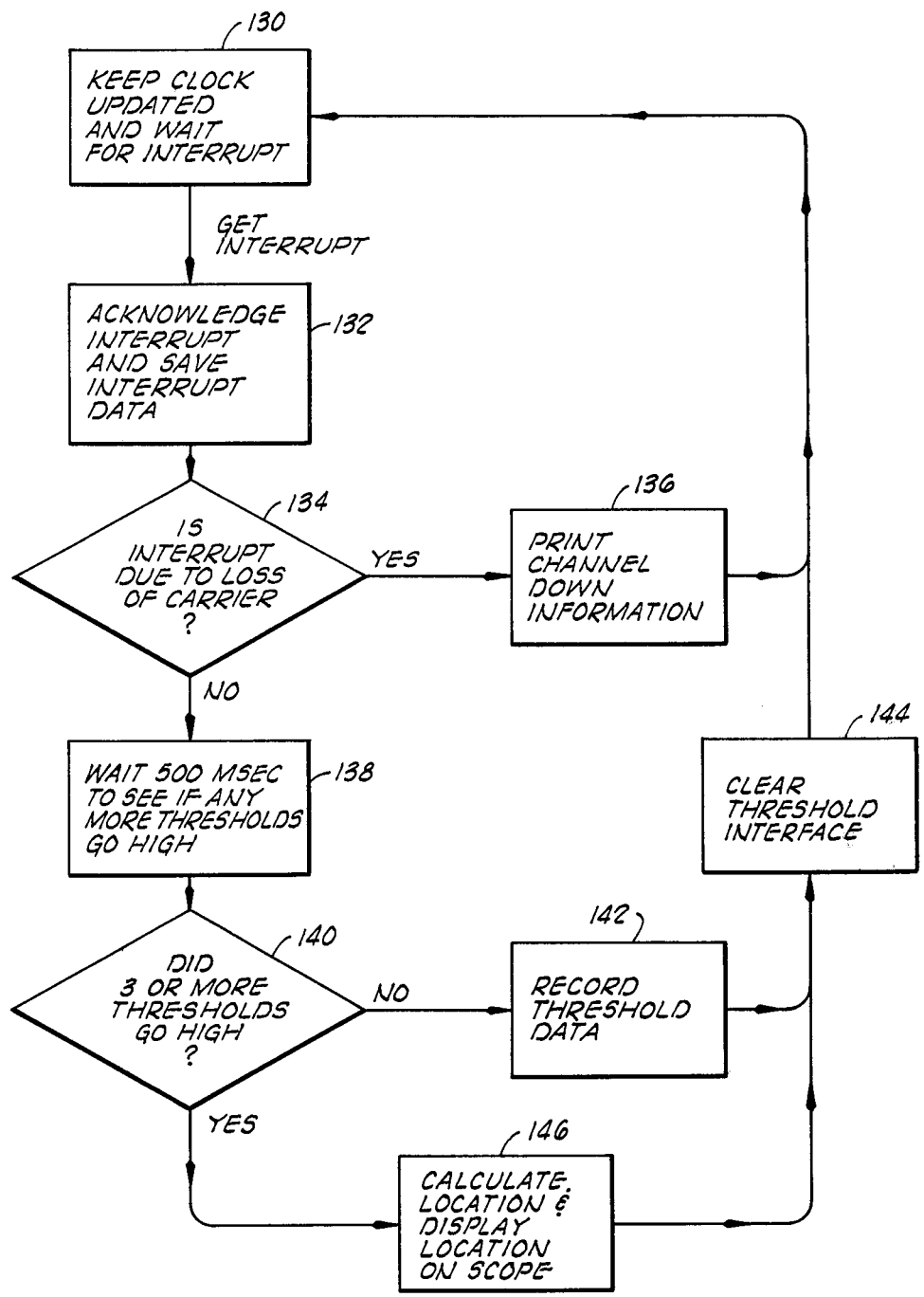
FIG. 7 is a flow diagram illustrating the basic program operation of the central data processing unit utilized in the present invention.

FIG. 7 illustrates in basic flow diagram the programmed operation of the computer utilized at the central processor and display 22 in central office equipment 16. An initial flow stage 130 signifies the function of clock update and interrupt response. That is, the computer sits in an idle state until occurrence of an interrupt. Interrupts can occur from any one of three sources; (1) from the interval timer which occurs every 500 microseconds and serves to keep the time of day as well as the time between events detected by one or more of the geophone position threshold detectors, (2) an interrupt as may be generated by the threshold detector outputs which would correspond to the arrival of a seismic event at a given geophone position, and (3) an interrupt which corresponds to carrier interrupt or a change in the status of the carrier signal from a given geophone position, i.e., either loss of signal or reception of signal from the affected geophone position.

The computer processes each of the interrupts in the following way. With the reception of an interrupt from the timer, the computer updates the time of day and then increments the interval time since the last threshold event. The reception of a threshold event causes the computer to store the threshold information and start a counter to wait for more events. The computer then stores the events which follow until no threshold goes high for a period of 500 milliseconds. At this time, the computer clears all threshold devices and waits for new interrupts. While waiting, it starts processing the previous interrupts. If only one or two threshold devices were actuated, a record is kept and printed out on the hour. However, if three or more devices are actuated, then the channel number and time of occurrence for each channel or geophone position is printed on the terminal. The location of the event is then calculated using a least squares approximation method, as will be further described, and when the location is calculated, it is printed on the terminal and the location is plotted on a map of the mine as delineated on the oscilloscope display. If a carrier interrupt is received, then the corresponding carrier change is noted on the printed record and, if a carrier is down, the computer issues a command to turn on an alarm light to warn attending personnel that a goephone signal is not being received.

Referring again to FIG. 7, an interrupt introduced through initial flow stage 130 is then applied to a processing stage 132 which stores and classifies interrupt data for input to a decision stage 134 which differentiates the interrupt as to a valid seismic signal versus carrier problem. Decision stage 134 queries as to whether or not the interrupt is due to loss of carrier, and if affirmative flow proceeds to stage 136, the appropriate channel data is recorded by printing with output indication to suitable alarm indicators. If decision stage 134 indicates negative, flow proceeds to stage 138 which functions to wait 500 milliseconds while searching all threshold data inputs to determine if any more threshold indications have gone high. This data is then processed through a decision stage 140 to determined whether or not three or more thresholds went high and, if negative, flow stage 142 records the threshold data and signifies to zero the system or clear threshold interface via flow stage 144 with flow return to the initial stage 130. If decision stage 140 indicates that three or more thresholds went high by affirmative response, a flow stage 146 then functions to calculate the location of the disturbance with consequent display on the associated mine layout scope.

Flow stage 146 performs a predefined computation utilizing the least squares approximation method and serves to locate in relation to the underground mine layout the disturbance source point. This is a well-known form of computer routine which is readily programmable into the Texas Instruments 980A computer as well as various other general purpose digital computer equipments. The procedure deals with location of the position of acoustic sources within the earth from recorded indications sensed at a number of the spaced geophone positions. The procedure assumes that the signal arriving at each geophone position has been processed so that the first arrival times can be identified for each station. Since the time that the source was initiated is unknown, the time differences among the stations must be used to locate the source through a process of three-dimensional triangulation, all necessary distance parameters being known. The method requires that the location $(x,y)$ for each geophone position be known, and initial guesses are provided for the source and arrival velocity of seismic energy. The program process assumes that because of relatively long horizontal travel distance as compared with the vertical travel distance, the explosion or disturbance arrival is via a refraction path. The equations relating to the time and distances are non-linear so that a non-linear estimation process may be used to estimate the unknown parameters. Thus, a step-wise Gauss-Newton iteration is done on each parameter so that the mean square error is minimized.

The functional relationships and corresponding parallel derivatives as utilized by the computation process are described below:

$t_{ij}$ = time difference between the "ith" and "jth" geophone positions;
$x_i$ = x coordinate for "ith" station;
$y_i$ = y coordinate for "ith" station;
$(\alpha,\beta) = (x,y)$ for source;
$v$ = velocity between source and receiver;
$DI2 = \sqrt{(x_i - \alpha)^2 + (y_i - \beta)^2}$; and
$DJ2 = \sqrt{(x_j - \alpha)^2 + (y_j - \beta)^2}$.

The refraction model estimates $(\alpha,\beta)$ may be set equal as follows:

$$t_{ij} = \frac{1}{v}(DI2 - DJ2) \tag{1}$$

$$\frac{\partial t_{ij}}{\partial v} = \frac{1}{v^2}(DI2 - DJ2) \tag{2}$$

$$\frac{\partial t_{ij}}{\partial \alpha} = \frac{1}{v}[(x_i - \alpha)/DI2 - (x_j - \alpha)/DJ2] \tag{3}$$

$$\frac{\partial t_{ij}}{\partial \beta} = \frac{1}{v}[(y_i - \beta)/DI2 - (y_j - \beta)/DJ2] \tag{4}$$

The monitoring method as herein performed is completely automatic. And, in order to guard against an extraneous time for one geophone position or station throwing the calculation of the seismic disturbance location off, the following checks are made.

If five or more geophone positions are used in the calculation, then the position which has the time having the largest deviation from the expected value is deleted. The location of the source is then recalculated and the ratio of the mean square errors is taken; if this ratio is greater than ten, the second calculation is used. This procedures assures that if all observations belong to the same event or underground disturbance, one will be thrown out only 2% of the time.

After performance of the above procedure, a second geophone position is chosen as a reference, then the above calculations are repeated with comparison of the results derived from each of the two geophone positions, and the one with the lowest mean square error is returned for further processing.

Finally, the calculation of the location of the source is thus performed four times when five or more stations are involved and twice when three or more stations are involved. This is done to minimize the effect of an error caused by a single station having an erroneous time. The only remaining check that is made in the process is to look out at the location of the source, and if the location is out of the area covered by the receivers, then the event can be ignored.

The foregoing describes a novel mine surveillance system which may be permanently installed to provide continual surveillance and output of record information relating to activity in and around an underground mine. The system is presently installed in a coal mine of relatively large underground expanse utilizing nine geophone stations or permanent installation positions, and the continually monitored data provides indication of all normal and working activity in the mine as well as other abnormal seismic disturbances arising due to explosions, roof falls and other irregular events occurring in the underground mine. The present method provides continual surveillance of highly reliable nature and is carried out with equipment which is relatively economical in relation to the very great and valuable function performed.

Changes may be made in the combination and arrangement of steps as heretofore set forth in the specification and shown in the drawings; it being understood that changes may be made in the embodiments disclosed without departing from the spirit and scope of the invention as defined in the following claims.

What is claimed is:

1. A mine surveillance system for continually monitoring activity in and around an underground mine, comprising:

plural seismic energy sensing means wherein each comprises a geophone which is permanently encased and buried underground at preselected depths at each of selected positions of the earth surface over said underground mine, plural signal conditioning means each disposed proximate a respective sensing means and receiving sensed seismic signals therefrom, and each of said signal conditioning means comprises gain controlled amplifier means wherein feedback to amplifier output to a field effect transistor circuit controls amplifier output to allow high gain output for a very brief interval relative to the characteristic time of the seismic signal input whereupon the output is clamped to a selected low amplitude for a predetermined long duration relative to said brief interval which duration reflects the character, propensities, and reoccurrences probabilities of seismic signals to be encountered at the mine, means for modulating seismic signal output from each of said signal conditioning means for carrier transmission to a central position, receiving means at said central position for filtering and demodulating each of said transmission signals to regenerate said plurality of seismic signals, plural threshold detection means each receiving one of said seismic signals to generate a threshold output when respective seismic signals exceed a predetermined amplitude, computer means including a threshold interface receiving all threshold outputs to generate data indication of seismic disturbance for all selected positions over said underground mine, carrier detector means each receiving demodulation output from a respective receiving means to generate a carrier output signal when respective carrier signals are present, and means for applying said detected carrier output signal to said threshold interface for logical input to said computer means, display means receiving input from the output data indication of said computer means, and said computer means functions in response to the known positions and depth of each said seismic energy sensing means to process all threshold output data indications wherein said computer means continually checks threshold output data indications to assure that three or more of said threshold outputs were generated whereupon location of the seismic disturbance is then calculated for output display in relation to the bounds of said underground mine on said display means.

2. A mine surveillance system as set forth in claim 1 which is further characterized to include:

an overlay plan map of the underground mine for transparent overlay on said display means to effect visible indication of the seismic disturbance in relation to the underground mine.

3. A mine surveillance system as set forth in claim 1 which is further characterized to include:

recording means receiving threshold output data indication from said computer means to maintain a continual time record of mine activity in and around said underground mine.

4. A mine surveillance system as set forth in claim 1 wherein said threshold interface comprises:

input logic means receiving as input each of said threshold outputs for qualification as to input to said computer means.

5. A mine surveillance system as set forth in claim 1 wherein:

said gain controlled amplifier means brief interval is on the order of three hundred milliseconds while said relative long duration is on the order of 1 to 2 seconds.

* * * * *